US011676130B2

(12) United States Patent
Brosnan et al.

(10) Patent No.: US 11,676,130 B2
(45) Date of Patent: Jun. 13, 2023

(54) CONTROLLING A CUSTOMER'S MOBILE DEVICE TO SELECTIVELY PERFORM THE FUNCTIONS OF A SELF-CHECKOUT (SCO) STATION

(71) Applicant: Toshiba Global Commerce Solutions Holdings Corporation, Tokyo (JP)

(72) Inventors: Susan W. Brosnan, Raleigh, NC (US); Brad M. Johnson, Raleigh, NC (US); Hye Suk Makley, Morrisville, NC (US); Stacy Arrington, Morrisville, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 16 days.

(21) Appl. No.: 16/833,738

(22) Filed: Mar. 30, 2020

(65) Prior Publication Data

US 2021/0304186 A1    Sep. 30, 2021

(51) Int. Cl.
*G06Q 20/32* (2012.01)
*G06Q 20/20* (2012.01)

(52) U.S. Cl.
CPC ....... *G06Q 20/3278* (2013.01); *G06Q 20/204* (2013.01); *G06Q 20/206* (2013.01); *G06Q 20/3223* (2013.01)

(58) Field of Classification Search
CPC .... G06Q 20/208; G06Q 20/20; G06Q 20/202; G06Q 20/322; G06Q 20/3278
See application file for complete search history.

(56) References Cited

U.S. PATENT DOCUMENTS

| 10,210,469 | B2* | 2/2019 | Balchin | H04W 4/80 |
| 10,776,775 | B1* | 9/2020 | Rule | G06Q 20/346 |
| 2004/0203349 | A1* | 10/2004 | Detweiler | H04W 4/00 |
| | | | | 455/41.1 |
| 2014/0274056 | A1* | 9/2014 | Hyde | H04W 48/18 |
| | | | | 455/436 |
| 2014/0310610 | A1* | 10/2014 | Ricci | A61B 5/0077 |
| | | | | 715/744 |
| 2015/0105901 | A1* | 4/2015 | Joshi | G06Q 20/18 |
| | | | | 700/232 |
| 2015/0269835 | A1* | 9/2015 | Benoit | H04M 19/04 |
| | | | | 340/539.13 |
| 2016/0099895 | A1* | 4/2016 | Crawford | H04L 51/046 |
| | | | | 709/206 |
| 2016/0309000 | A1* | 10/2016 | Mao | G06Q 50/01 |
| 2016/0316503 | A1* | 10/2016 | Raphael | H04W 76/11 |
| 2019/0043340 | A1* | 2/2019 | Kayhani | H04W 4/022 |
| 2019/0173994 | A1* | 6/2019 | Ivashyn | G06F 21/41 |
| 2020/0097120 | A1* | 3/2020 | Klein | G06F 3/04886 |
| 2020/0312100 | A1* | 10/2020 | Makley | A47F 9/04 |
| 2020/0361711 | A1* | 11/2020 | Must | B65G 1/12 |
| 2021/0125169 | A1* | 4/2021 | Berdugo | G09B 21/006 |

FOREIGN PATENT DOCUMENTS

| GB | 2417649 A | | 3/2006 | |
| JP | 2003272051 A | | 9/2003 | |
| WO | WO2018/189603 | * | 10/2018 | G06Q 20/18 |

* cited by examiner

Primary Examiner — Peter Ludwig
(74) Attorney, Agent, or Firm — Coats & Bennett, PLLC

(57) ABSTRACT

A network node associated with a retail store.

21 Claims, 8 Drawing Sheets

PROCESSING CIRCUITRY
112

COMMUNICATIONS INTERFACE UNIT/MODULE
130

ACCESSIBILITY OBTAINING UNIT/MODULE
132

ADA DETERMINATION UNIT/MODULE
134

SCO FUNCTION SELECTION UNIT/MODULE
136

MOBILE DEVICE CONTROL UNIT/MODULE
138

CHECKOUT PROCESSING UNIT/MODULE
140

FIG. 8

CONTROLLING A CUSTOMER'S MOBILE DEVICE TO SELECTIVELY PERFORM THE FUNCTIONS OF A SELF-CHECKOUT (SCO) STATION

TECHNICAL FIELD

The present disclosure relates generally to checkout systems in retail establishments, and more particularly to self-checkout (SCO) systems at a retail store.

BACKGROUND

Many retailers utilize self-checkout (SCO) stations as an alternative to conventional attendant-assisted checkout lanes. As is known in the art, SCO stations allow customers to process their own purchases. Particularly, customers use a SCO station to scan, and sometimes weigh, the items they would like to purchase before placing the items in a bagging area. Once all items have been scanned, customers utilize the SCO station to apply payment.

While useful, SCO stations are not always convenient and easy-to-use for all customers. For example, due to their limited reach, disabled customers, such as those confined to a wheelchair, can have a difficult time utilizing the scanners and payment processing devices (e.g., a PIN pad) on SCO stations. The Americans with Disabilities Act (ADA) of 1990, as well as it subsequent amendments, define limitations on the height and depth of SCO stations to ensure that disabled customers have an easier time interfacing with, and performing, SCO functions. However, federal regulations complicate the design of SCO stations thereby making them more costly to manufacture and sell.

BRIEF DESCRIPTION OF THE DRAWINGS

FIG. 8 is a schematic block diagram of a computer program product that configures a computer to control a customer's mobile device to perform an SCO function according to one embodiment of the present disclosure.

DETAILED DESCRIPTION

Figure 1:
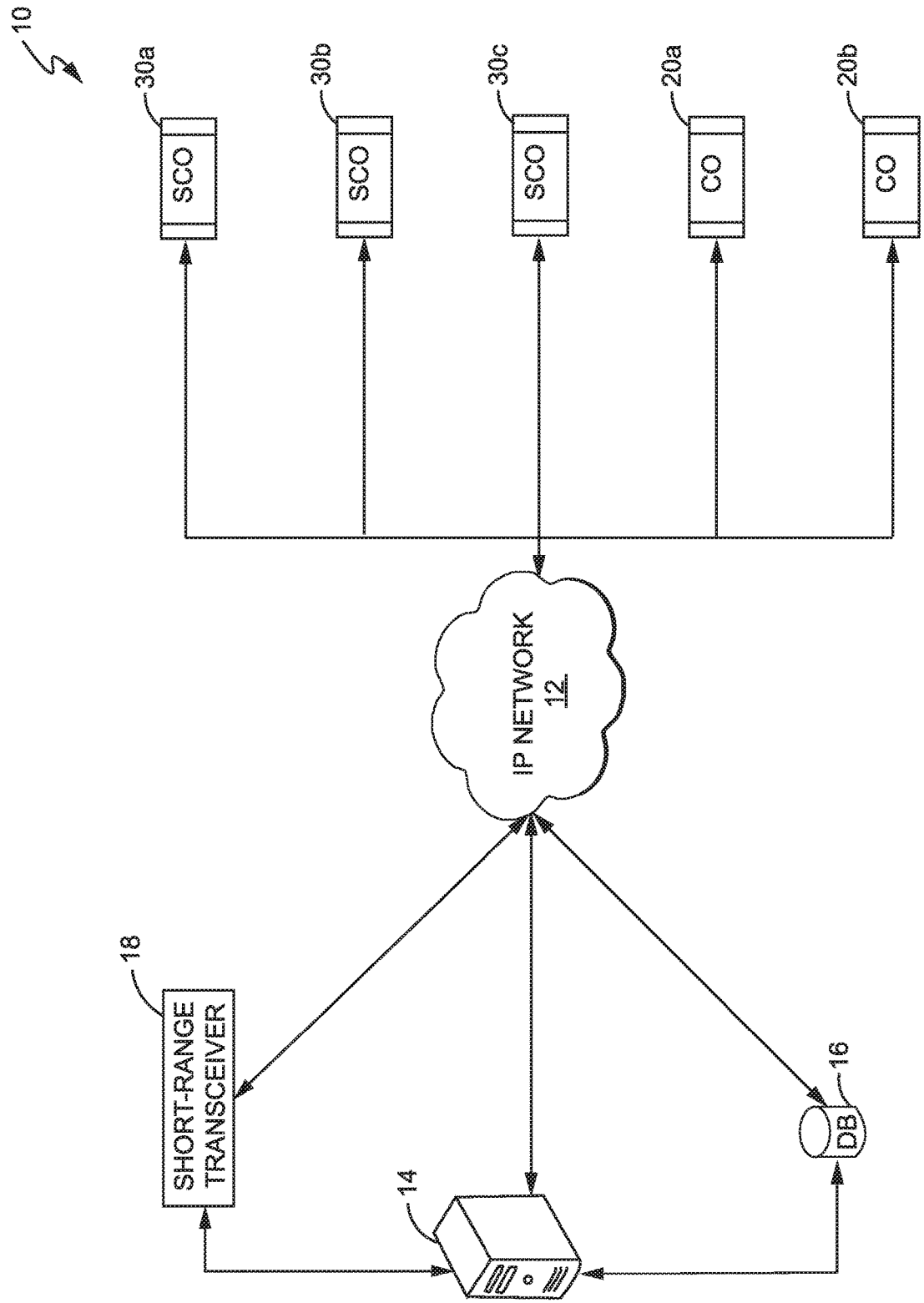
FIG. 1 is block diagram illustrating a communications system for a retail store configured according to one embodiment of the present disclosure.

Embodiments of the present disclosure provide a technique that helps customers having a disability recognized by the Americans with Disabilities Act (ADA) to interact with and utilize self-checkout (SCO) stations in retail establishments. As defined herein, disabilities recognized by the ADA are those defined in the ADA regulations that went into effect on Jul. 26, 1991 (i.e., the ADA 1991 Standards), as well as all subsequent updates and revisions including those that went into effect on Mar. 15, 2011, Oct. 11, 2016, and Jan. 17, 2017.

In more detail, customers that have a disability recognized by the ADA are detected when they approach a self-checkout (SCO) station. For example, a retail establishment may determine that a customer has an ADA recognized disability based on accessibility information obtained from the customer's mobile device, or on information about the customer the retail store has stored in a database. So determined, the retail establishment can control the customer's mobile device such that it will perform one or more selected SCO functions in lieu of the SCO station.

For example, consider a customer bound to a wheelchair or scooter that has selected a large and/or heavy item to purchase. Although such items may be carried in a basket or other container on the wheelchair or scooter, they are often times too bulky and/or awkward for the customer to lift onto the SCO scanner. Conventionally, the customer would require assistance from a store employee in order to scan these kinds of items. With embodiments of the present disclosure, however, a computer associated with the retail establishment would, upon recognizing that the customer has an ADA recognized disability, send a control signal to the customer's mobile device. The control signal would configure the customer's mobile device so that it performs the SCO scanning function in lieu of the SCO station. The data scanned by the customer's mobile device would then be provided to the SCO station and/or one or more other network nodes responsible for checkout processing. This eases the burden of checkout processing for customers having ADA recognized disabilities by negating the need for such customers to lift large and/or bulky items up onto the SCO scanner for scanning, and instead, allowing them to scan such items while they are still in the cart.

Similar functionality also occurs with other SCO functions, such as payment functions and signature functions. For example, the customer confined to a wheelchair may find it extremely difficult to reach a pin pad, a credit card reader, or a signature capture pad. In each case, the present embodiments recognize the customer's disabilities and will configure the customer's mobile device to perform those functions in lieu of the SCO station.

It should be noted, however, that the present embodiments are not limited to an "all-or-none" implementation. That is, although possible, a computer configured according to the present disclosure is not limited merely to controlling the customer's mobile device to perform either all the SCO functions, or none of the SCO functions. Rather, a computer configured to implement the techniques described herein is able to control the customer's mobile device to perform selected SCO functions while allowing the SCO station to perform other SCO functions.

Turning now to the drawings, FIG. 1 is block diagram illustrating a communications network 10 for a retail store according to one embodiment of the present disclosure. Those of ordinary skill in the art should readily appreciate that FIG. 1 is merely illustrative of some of the components comprising such a network 10, and that other components may or may not be present in network 10.

As seen in FIG. 1, network 10 comprises an IP network 12 communicatively interconnecting a network node 14

(e.g., an application server), a database (DB16), a short-range transceiver 18, one or more conventional checkout (CO) stations 20a, 20b (collectively, CO stations 20), and a plurality of self-checkout (SCO) stations 30a, 30b, 30c (collectively, "SCO stations 30).

IP network 12 comprises one or more private and/or public IP networks (e.g., the Internet) configured to carry information as data packets. IP network 12 may operate according to any protocol known in the art, but in at least one embodiment, carries data packets between components using the well-known TCP/IP protocol.

Network node 14 comprises a computer, such as an application server, for example, configured to process transaction data provided by SCO stations 20 and CO stations 22. Typically, such data is processed when customers checkout. In addition to its conventional functions, however, network node 16 is configured to determine whether a given customer has an ADA recognized disability, and if so, control the customer's mobile device to perform one or more of the SCO functions in lieu of the SCO station 22. As will be described in more detail later, determining whether the customer has a bona-fide ADA recognized disability is based on accessibility information obtained from the customer's own mobile device and/or customer loyalty records stored in DB 16.

Short-range transceiver 18 comprises any transceiver known in the art configured to detect the presence of a customer's mobile device in close proximity, and upon such detection, establish a communications link with that mobile device so that network node 14 can control the operation of the mobile device. In one embodiment, for example, short-range transceiver 18 comprises a BLUETOOTH transceiver operating according to the well-known BLUETOOTH wireless protocol. In these cases, short-range transceiver 18 may be implemented as a standalone component, or implemented in network node 14, or implemented in one or more of the SCO stations 30. In other embodiments, short-range transceiver 18 is a Near Field Communication (NFC) transceiver implemented as part of SCO station 30. In still other embodiments, such as those described later in more detail, short-range transceiver 18 comprises both a BLUETOOTH transceiver and an NFC transceiver.

The SCO stations 30 and the CO stations 20 are devices that customers can use to process their selected items for payment. Particularly, CO stations 20 are conventional checkout stations in which attendants, usually store employees, scan and bag the customer's selected items, and accept payment from the customer for those items. SCO stations 30, however, are self-checkout stations in which the customer will scan, bag, and process payment for the selected items without assistance from a store attendant. In these latter cases, the customer must be able to physically reach the various components of the SCO station 30 in order to perform the self-checkout process.

Figure 2:
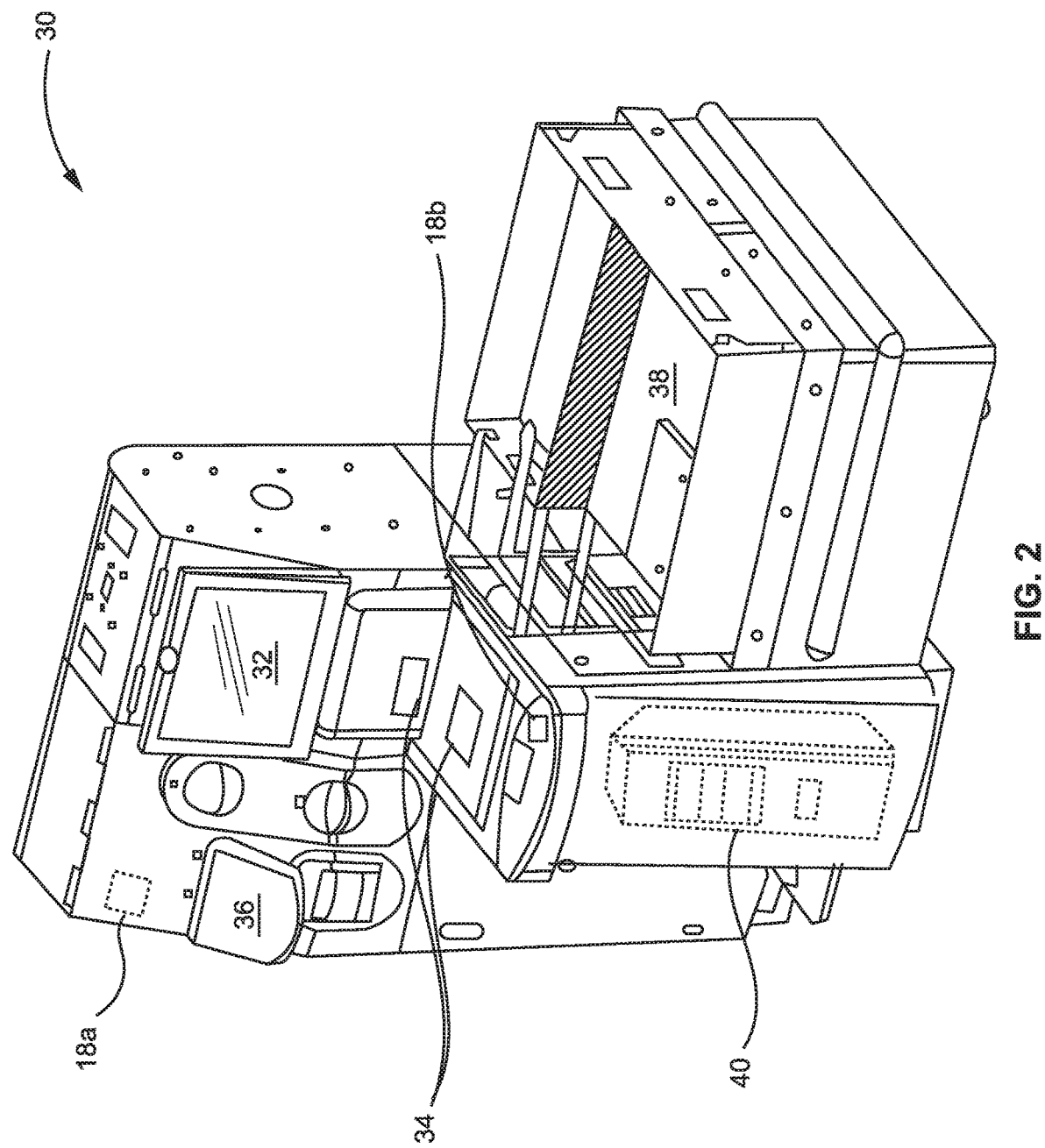
FIG. 2 is a perspective view of a self-checkout (SCO) station configured according to one embodiment of the present disclosure.

FIG. 2 is a perspective view of an SCO station 30 configured according to one embodiment of the present disclosure. As seen in FIG. 2, SCO station 30 may comprise any known self-checkout station known in the art and typically comprises a touch-screen display 32 that displays the items scanned by the customer, one or more optical scanners 34 configured to scan the Product Lookup (PLU) codes affixed to the labels on the items selected by the customer, a pin pad 36 configured to accept payment details from the customer, a bagging area 38 configured to hold the items that have been successfully scanned, and a SCO control computer 40 configured to control the operation of SCO station 30.

In addition to these conventional functions, however, an SCO station 30 configured according to this embodiment may also comprise, as integrated components, one or both of a BLUETOOTH transceiver 18a and an NFC transceiver 18b. In particular, NFC transceiver 18b establishes a communications link with the customer's mobile device, which is also NFC-capable, when the customer places the mobile device proximate the NFC transceiver 18b (e.g., about 1½ inches away from the NFC transceiver 18b). Once the link is established, network node 14 can access the information stored on the customer's mobile device. Such information includes, but is not limited to, the particular checkout lane the customer is in, the international mobile subscriber identity (IMSI) of the mobile device, customer loyalty identifiers, the customer's bank and/or credit card information, the customer's accessibility settings, and the like. In the latter case, the customer's accessibility settings comprise information that is used to determine whether the customer has a bona-fide ADA recognized disability, and if so, to control the customer's mobile device to perform select SCO functions in lieu of SCO station 30.

BLUETOOTH transceiver 18a also establishes a communications link responsive to detecting that the customer's mobile device has moved within close proximity of the SCO station 30 (e.g., up to about 100 m). Like NFC transceiver 18b, BLUETOOTH transceiver 18a facilitates the ability of network node 14 to access the information (e.g., the IMSI, customer loyalty identifiers, bank and/or credit card information, the customer's accessibility settings, which checkout lane the customer is in, and the like) stored on the customer's mobile device. Then, based on this information, network node 14 determines whether the customer has a bona-fide ADA recognized disability, and if so, controls the customer's mobile device to perform selected SCO functions in lieu of SCO station 30.

In one embodiment, SCO station 30 is configured with both the BLUETOOTH transceiver 18a and the NFC transceiver 18b. In these cases, the customer may initially communicate the information from his/her mobile device to network node 14 via the NFC transceiver 18b. Upon receipt, NFC transceiver 18b sends that customer information to computer 40, for example, to transmit to network node 14. Once network node 14 has received the customer's information obtained by NFC transceiver 18b, it can establish a second communications link with the customer's mobile device 18a using the BLUETOOTH transceiver 18a and determine if the customer has a disability recognized by the ADA. If so, network node 14 can send one or more control signals to the customer's mobile device via the BLUETOOTH transceiver 18a to control that device to perform selected SCO functions in lieu of SCO station 30.

The use of both an NFC transceiver 18b and a BLUETOOTH transceiver 18a is particularly beneficial. Specifically, at least some of the information transmitted from the customer's mobile device to the NFC transceiver 18b may be private or sensitive. Because BLUETOOTH transceiver 18a covers a significantly broader area (e.g., up to 400 m), there is a risk that a malicious third party might steal the customer's information. However, because the transmission of the customer's information to NFC transceiver 18b occurs over a very small distance, the risk that a malicious third party might attempt to steal the customer's data is significantly reduced. Therefore, this aspect of the present disclosure helps keep the customer's information sensitive secure.

Figure 3:
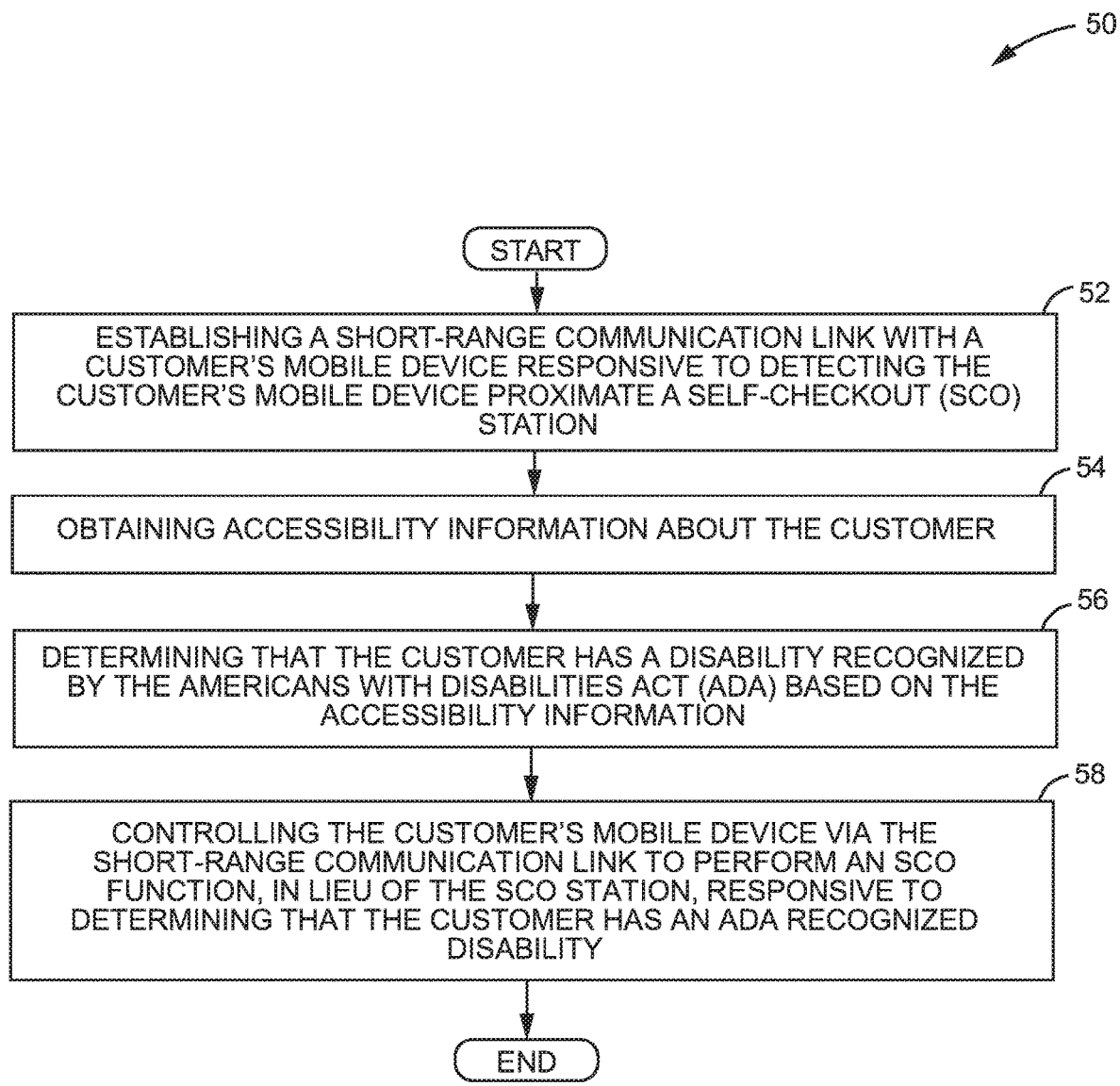
FIG. 3 is a flow diagram illustrating a method for controlling a customer's mobile device to perform a self-checkout (SCO) function according to one embodiment of the present disclosure.

FIG. 3 is a flow diagram illustrating a method 50 for controlling a customer's mobile device to perform one or more selected SCO functions according to one embodiment of the present disclosure. As seen in FIG. 3, method 50 begins with establishing a short-range communication link between the customer's mobile device and short-range transceiver 18 responsive to detecting that the customer's mobile device is proximate the SCO station 30 (box 52). As stated above, the customer may initiate the establishment of this link by placing his/her mobile device next to NFC transceiver 18*b*. Alternatively, or in addition, the BLUETOOTH transceiver 18*a* may detect the customer's mobile device as he/she approaches a given SCO station 30, and in response, establish a communications link with the customer's mobile device.

The processes for establishing these types of communications links are well-understood by those of ordinary skill in the art, and thus, are not described in detail here. However, it is sufficient to understand that once the link(s) is/are established, the customer accessibility settings are obtained from the customer's mobile device an provided to network node 14 via IP network 12 (box 54). Network node 14 then determines whether the customer accessibility settings retrieved from the customer's mobile device indicates that he/she has an ADA-recognized disability (box 56), and if so, controls the customer's mobile device to perform one or more selected SCO functions in lieu of SCO station 30 (box 58).

Figure 4:
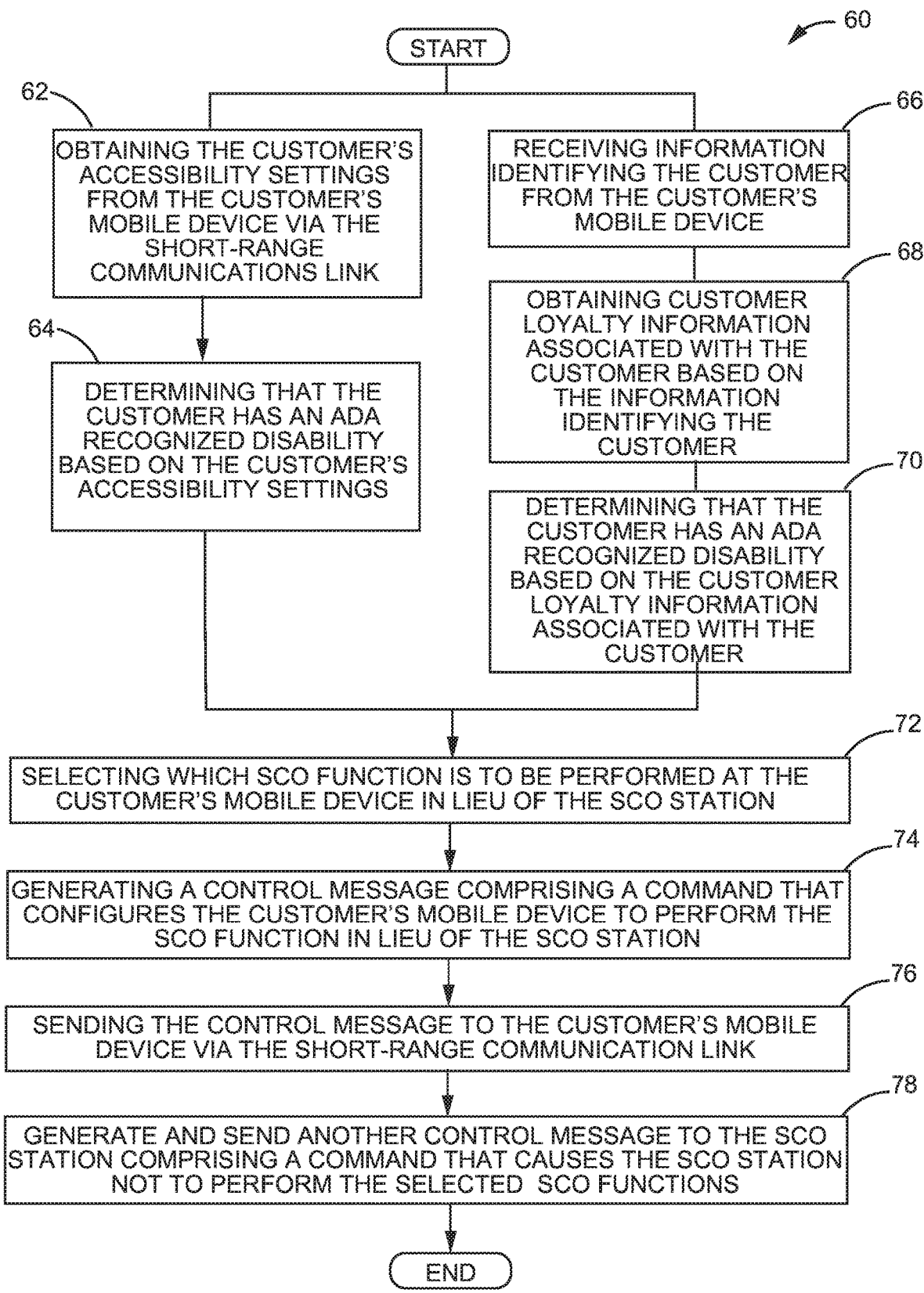
FIG. 4 is a flow diagram illustrating a method for obtaining information on whether a customer has a disability recognized under the Americans with Disability Act (ADA) according to one embodiment of the present disclosure.

FIG. 4 is a flow diagram illustrating a method 60, implemented by network node 14, for obtaining information on whether a customer has an ADA recognized disability according to one embodiment of the present disclosure. As seen in FIG. 4, network node 14 can obtain the information in multiple ways. In one embodiment, network node 14 obtains the customer's accessibility settings from the customer's mobile device (box 62). As previously stated, the customer's accessibility settings may be obtained via the NFC communications link established between the customer's mobile device and the NFC transceiver 18*b*, or the BLUETOOTH communications link between the customer's mobile device and the BLUETOOTH transceiver 18*a*. By way of example only, such information may be obtained using a request-response protocol. Particularly, in one embodiment, network node 14 generates and sends a request message to the customer's mobile device requesting the accessibility settings stored thereon. In response, the customer's mobile device generates and sends a response message that include the requested accessibility settings to network node 14.

Once obtained, network node 14 analyzes the accessibility settings to determine whether the customer has an ADA recognized disability (box 64). Particularly, the accessibility settings on the customer's mobile device include vision, hearing, physical and motor skills, educational settings, and the like. The settings are customizable by the customer and make it easier for them to utilize their mobile device. For example, someone with poor vision may increase the font size. Once set, applications configured to comply with the vision settings will display their output (e.g., text) in the newly-specified font size. Similarly, Real-Time Text (RTT) and Teletype (TTY) settings configure the customer's device to transmit text as he/she types thereby allowing the recipient to read the message right away. RTT protocols additionally convert text to audio, thereby allowing the recipient to hear what the sender is typing. The Motion settings reduce or stop certain elements from moving on the mobile device display and is useful for people who have a sensitivity to motion. The Touch setting are useful for people with motor skills difficulties, thereby allowing them to customize how their device responds to touch. Other settings, such as Spoken Content, Voice Control Settings, and Magnifier, also assist customers in utilizing their devices.

Although these accessibility settings facilitate a disabled customer's ability to utilize his/her device, network node 14 can, according to this embodiment, utilize that information to determine whether the customer has an ADA recognized disability. For example, network node 14 might determine that the customer has an ADA recognized disability with respect to vision if the customer accessibility settings obtained from the customer's mobile device indicate that the customer has increased the font size beyond a predetermined threshold size. Similarly, such determinations can be made based on the information obtained from the customer's Touch settings (e.g., the customer may have reduced or impaired motor skills), or Motion settings (e.g., the customer may have epilepsy).

The customer's accessibility settings are not the only way in which the network node 14 can determine whether the customer has an ADA recognized disability. In another embodiment, for example, network node 14 makes the determination based on other information. In this embodiment, seen in FIG. 4, network node 14 receives information that identifies the customer from the customer's mobile device (box 66). Such information may be obtained using the same or similar request/response mechanisms described above (e.g., via the NFC link and/or the BLUETOOTH link), and may include information such as the IMSI of the customer's mobile device, a customer loyalty ID stored in memory of the customer's mobile device, and/or other information that can be used to uniquely identify the customer to network node 14. Once obtained, network node 14 uses the information to query the customer loyalty information stored in DB 16 and obtain the corresponding customer loyalty information (box 68). In these cases, the customer loyalty information would contain information specifying whether the customer is/is not disabled, thereby allowing network node 14 to determine whether the customer does/ does not have an ADA recognized disability (box 70).

In addition to these two embodiments, there are other ways in which network node 14 can determine the disability status of a given customer. However, regardless of how network node 14 makes that determination, network node 14 is configured to select one or more SCO functions to be performed by the customer's mobile device in lieu of SCO station 30 (box 72). For example, if it is determined that the customer has motor skills difficulties, they may have a difficult time reaching pin pad 36. In such cases, network node 14 may select the payment and signature functions normally performed by SCO station 30 to be performed by the customer's mobile device. Similarly, if network node determines that the customer has a problem with vision, the display functions of SCO station 30 may be performed by the customer's mobile device instead of SCO station 30.

In one embodiment, network node determines that the customer has motor skills issues, and therefore, may not be able to lift large or bulky items onto the scanner 34. In these situations, network node 14 will configure the customer's mobile device to perform the SCO scanning function in lieu of SCO station 30. So configured, the customer can utilize his/her mobile device to scan the PLU or other information on the item to purchase the item.

Network node 14 may decide, based on the obtained customer information, that all SCO functions are to be performed by the customer's mobile device, or that only some of the SCO functions are to be performed by the customer's mobile device. Regardless, however, network node 14 generates a control message comprising a command that configured the customer's mobile device to perform the selected SCO functions in lieu of SCO station 30 (box 74) and sends that control message to the customer's mobile device via the short-range communications link (box 76). Additionally, in some embodiments, network node 14 generates and sends another control message to control computer 40 of SCO station 30 (box 78). The control message sent to control computer 40 contains one or more commands that cause SCO station 30 not to perform the selected functions that the customer's mobile device will perform.

Figure 5:
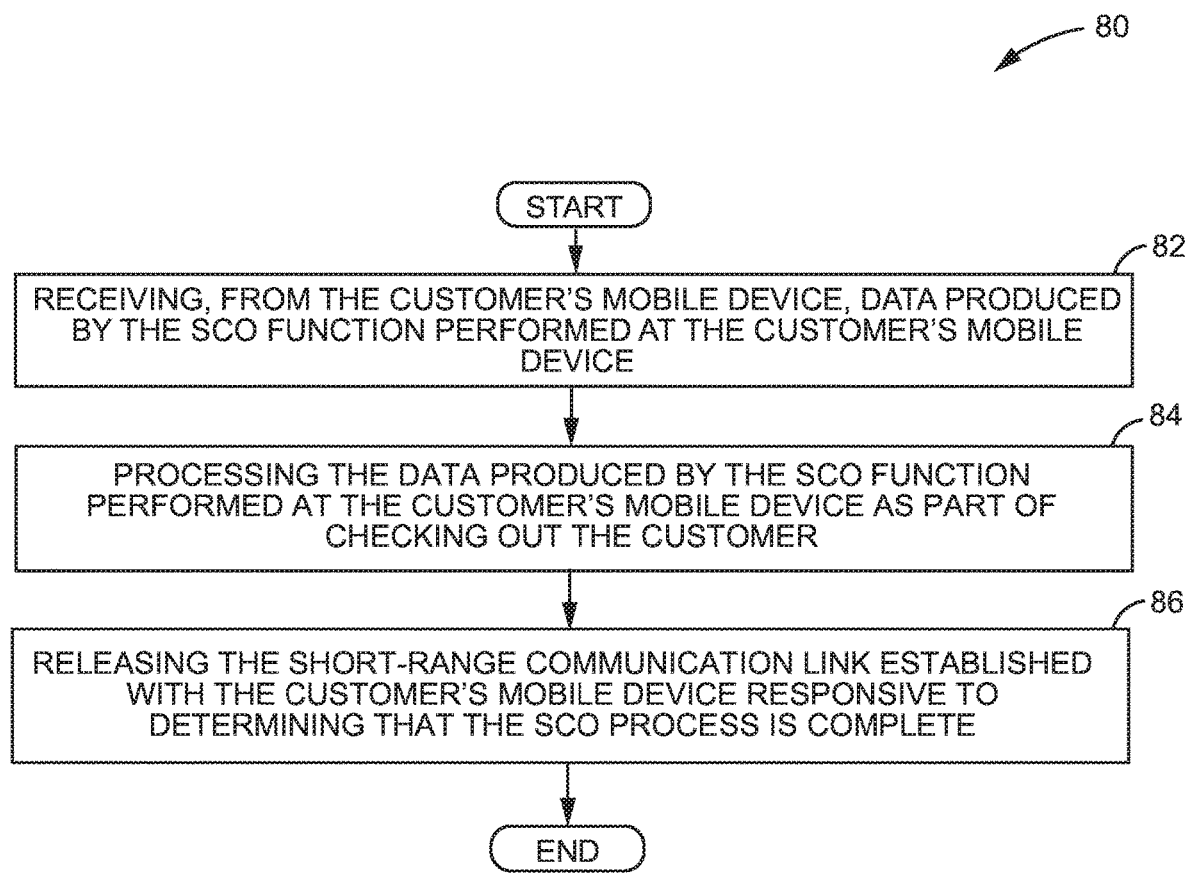
FIG. 5 is a flow diagram illustrating a method for checking out a customer based on data received from a customer's mobile device according to one embodiment of the present disclosure.

FIG. 5 is a flow diagram illustrating a method 80 for checking out a customer based on the data received from the customer's mobile device according to one embodiment of the present disclosure. Specifically, in this embodiment, network node 14 receives the data produced by the selected SCO function(s) performed by the customer's mobile device (box 82), and then processes the received data in order to checkout the customer (box 84). Such processing includes, but is not limited to, maintaining a running list of the items scanned by the customer, computing the total cost, and outputting that information to keep the customer informed as to the checkout process. For example, consider a customer who has a difficult time discerning the text output to display 32 of SCO station 30 due to poor vision. In these cases, the checkout processing would include network node 14 outputting data normally sent to SCO station 30 for output on display 32 to the customer's mobile device instead. A similar process occurs with respect to the other SCO functions, such as scanning and payment processing. Particularly, in cases where these functions are performed at the customer's mobile device, network node 14 receives data corresponding to those functions from the customer's mobile device instead of from the SCO station 30.

Figure 6:
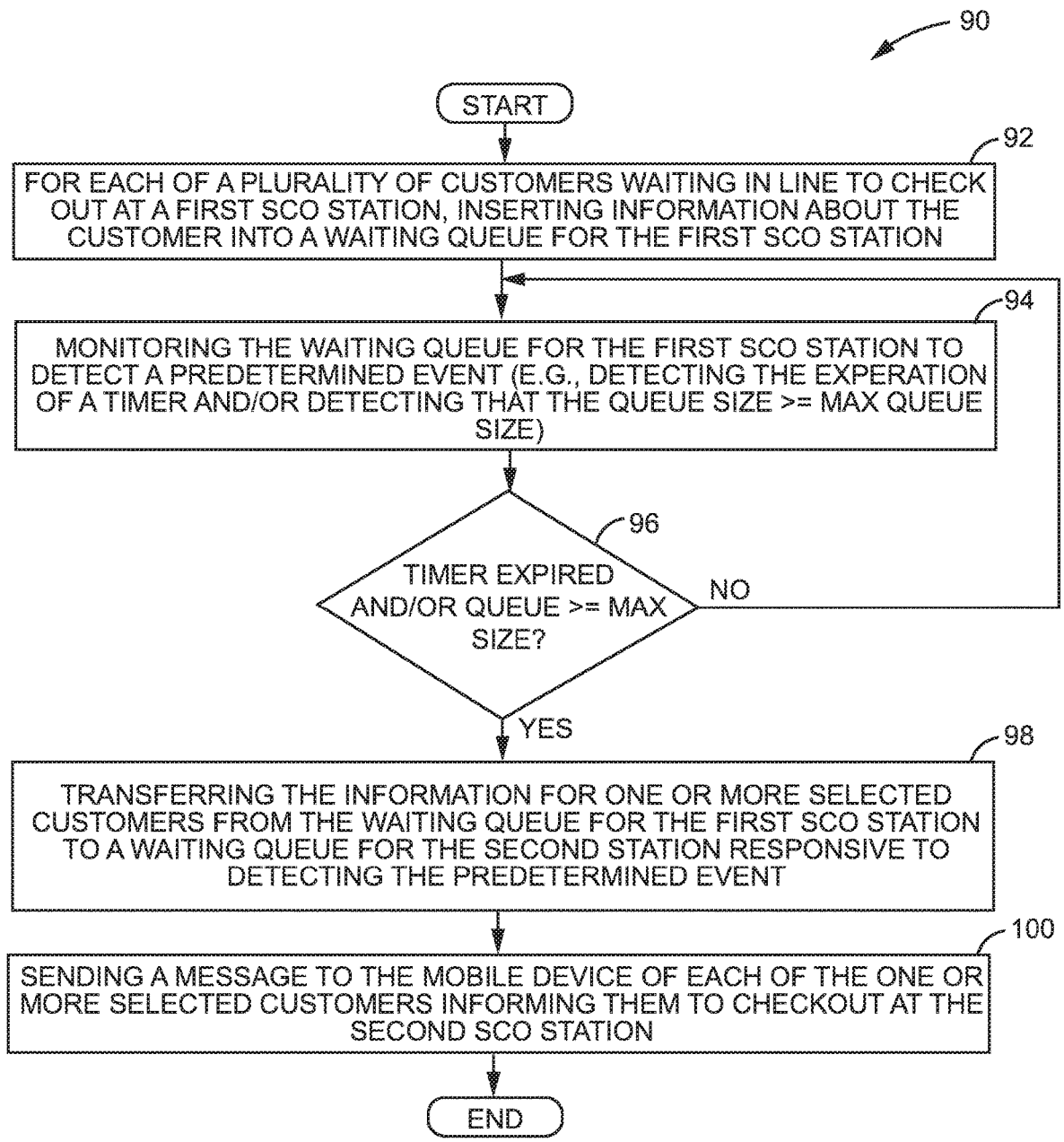
FIG. 6 is a flow diagram illustrating a method for managing checkout queues according to one embodiment of the present disclosure.

In addition to the functions above, embodiments of the present disclosure are also configured to manage the lines or "queues" of customers at the various CO stations 20 and SCO stations 30. Particularly, FIG. 6 is a flow diagram illustrating a method 90 for managing checkout queues according to one embodiment of the present disclosure. As seen in FIG. 6, network node 14 maintains a "wait queue" for each CO station 20 and SCO station 30. Each time a customer enters a lane for checkout at an SCO station 30, network node 14 obtains information about the customer and inserts an entry containing that information into the corresponding queue (box 92). For example, as described previously, network node 14 may obtain the customer accessibility information from the customer's mobile device responsive to the BLUETOOTH transceiver 18a detecting, and establishing a communications link with, the customer's mobile device. In at least one embodiment, the network node 14 is configured to determine which particular lane the customer is in based on information provided by the BLUETOOTH transceiver 18b.

By way of example, BLUETOOTH transceiver 18a may compute distance to the customer's mobile device based on any of a plurality of well-known Time to Arrival (TOA) techniques. Those devices associated with the shortest round-trip times are considered to be in the same lane as the BLUETOOTH transceiver 18a. In other embodiments, BLUETOOTH transceiver 18a may determine which lane the customer is in based on received signal strength techniques. In these embodiments, each SCO station 30 may integrate its own BLUETOOTH transceiver 18a. Mobile devices that are in the same lane as the BLUETOOTH transceiver 18a would have a stronger signal strength than those that are positioned in adjacent lanes, and thus, would be considered as being in the same lane as the BLUETOOTH transceiver 18a. In yet other embodiments, the customer may manually specify his/her lane to network node 14 using his/her mobile device. For example, the customer may enter the lane information responsive to a prompt displayed on his/her mobile device, or the lane information may be determined when the customer places his/her mobile device in close proximity to an NFC transceiver 18b in the lane. In these latter cases, either transceiver 18 can determine the lane and identify that lane to network node 14, or they can provide data to network node 14 so that it can determine which lane the customer is waiting in.

Regardless, once network node 14 has inserted an entry into the queue, network node 14 monitors the queue in order to detect whether a predetermined event occurs (box 94). For example, in one embodiment, network node 14 monitors the size of each queue. In another embodiment, network node 14 monitors a time that each entry remains in the queue. In either case, once the number of queue entries equals or exceeds a maximum queue size, or once a timer expires (box 96), network node 14 "rebalances" the number of customers in the lanes to relieve the congestion.

For example, whenever the number of queue entries equals or exceeds a maximum queue size, network node can move one or more customers from that lane to another lane, less congested lane. Similarly, in the "timed" cases, network node 14 may move one or more customers to a less congested lane upon the expiration of the timer.

By way of example, each time an entry is inserted into a wait queue, network node 14 may begin a timer associated with that entry. The timer may, for example, be set to a predetermined amount of time. Each queue is monitored and, when a timer associated with a given entry expires, network node 14 considers the lane associated with that queue to be congested. When several timers expire in a given lane, network node 14 may determine that the lanes should be balanced by moving one or more customers to another, less congested lane.

For example, because of their disabilities, some customers may require more time to move through an SCO lane and complete the checkout process. Therefore, network node 14 may move one or more "able-bodied" customers to another, less congested lane for a different SCO station 30. A determination on which customers are "able-bodied" may be derived from the entries in the queue. Alternatively, network node 14 may identify the customers having an ADA recognized disability based on the entries in the queue, and move one or more of those customers to the less congested lane.

Regardless of how network node 14 rebalances the "customer load" between SCO stations 30, however, network node 14 transfers the information for the customers selected to be moved from the current queue to the queue associated with the less congested SCO station 30 (box 98). Additionally, network node 14 generates and sends a message to each of the selected customers informing them to move to the less congested SCO station for checkout (box 100).

Figure 7:
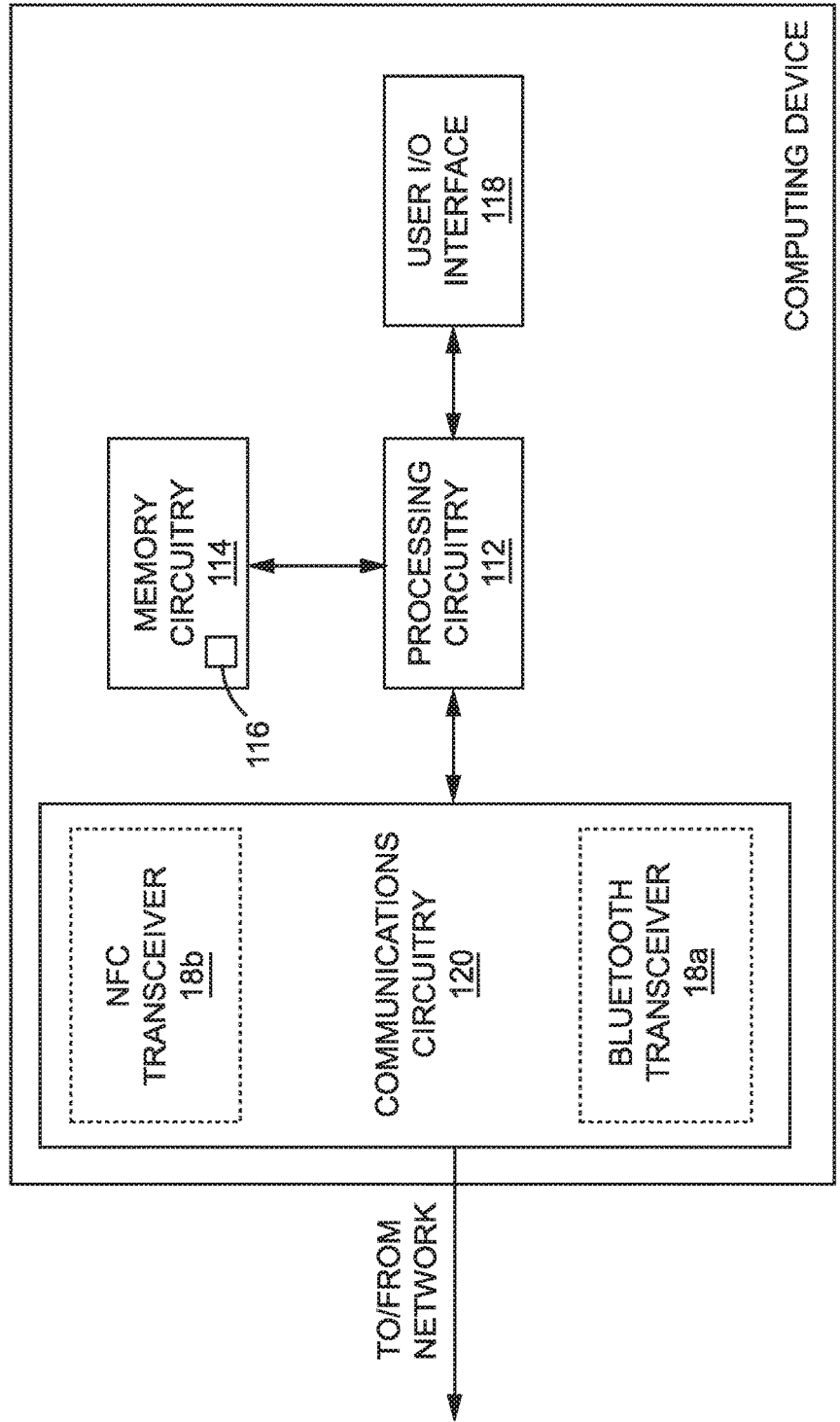
FIG. 7 is schematic block diagram illustrating some of the component parts of a computing device configured to control a customer's mobile device to perform an SCO function according to one embodiment of the present disclosure.

FIG. 7 is schematic block diagram illustrating some of the component parts of a computing device 110 configured to control a customer's mobile device to perform an SCO function according to one embodiment of the present disclosure. Computing device 110 is representative of network node 14 and the functions it performs according to the present disclosure. However, those of ordinary skill in the art should appreciate that the computing device 110 may also represent control computer 40 in embodiments where computer 40 performs the functions previously described. Additionally, those of ordinary skill in the art should appreciate that the components illustrated in FIG. 7 are merely exemplary, and that computing device 110 may comprise other components not explicitly shown in FIG. 7.

As seen in FIG. 7, computing device 110 comprises processing circuitry 112, memory circuitry 114 storing a control program 116, a user input/output (I/O) interface 118, and communications interface circuitry 120. Processing circuitry 112 comprises one or more microprocessors, hardware circuits, firmware or a combination thereof. In the exemplary embodiments described herein, processing circuitry 112, as previously described, is configured to obtain customer accessibility information from the customer's mobile device, determine whether the customer does/does not have an ADA recognized disability based on that customer accessibility information, and based on that determination, control the customer's mobile device to perform selected SCO functions in lieu of SCO station.

Memory circuitry 114 comprises a non-transitory computer readable medium that stores executable program code and data used by the processing circuitry 112 for operation. In this embodiment, the program code and data comprises a control program 116 that, when executed by processing circuitry 112, configures computing device 110 to perform the functions previously described. Memory circuitry 114 may include both volatile and non-volatile memory, and may comprise random access memory (RAM), read-only memory (ROM), and electrically erasable programmable ROM (EEPROM) and/or flash memory. Additionally or alternatively, memory circuitry 114 may comprise discrete memory devices, or be integrated with one or more microprocessors in the processing circuitry 112.

The user I/O interface 118 comprises one or more input devices and display devices to enable a user to interact with and computing device 110. Such devices may comprise any type of device for inputting data including, but not limited to, keyboards, number pads, push buttons, touchpads, touchscreens, or voice activated inputs. The display devices that comprise user I/O interface 118 may comprise, for example, a liquid crystal display (LCD) or light emitting diode (LED) display, or a touchscreen display that also functions as a user input device.

The communications interface circuitry 120 comprises, in one embodiment, a transceiver circuit and/or interface circuit for communicating with remote devices associated with the retail store. For example, using communications interface circuitry 120, computing device 110 can, as previously described, obtain customer accessibility information from the customer's mobile device, determine whether the customer does/does not have an ADA recognized disability based on that customer accessibility information, and based on that determination, control the customer's mobile device to perform selected SCO functions in lieu of SCO station.

In this regard, the communications interface circuitry 120 according to embodiments of the present disclosure may comprise a WiFi interface, a cellular radio interface, an Ethernet interface, or other similar interface for communicating over network 12. In some embodiments, communications interface circuitry 120 may comprise a BLUETOOTH interface, such as BLUETOOTH transceiver 18*a*, and/or an NFC interface such as NFC transceiver 18*b*. Such may be the case, for example with computing device 110 is the control computer 40 associated with the SCO station 30.

FIG. 8 is a schematic block diagram of a computer program product that configures network node 14 to control a customer's mobile device to perform an SCO function according to one embodiment of the present disclosure. As seen in FIG. 8, the computer program product comprises a plurality of units/modules including a communications interface unit/module 130, an accessibility obtaining unit/module 132, an ADA determination unit/module 134, an SCO function selection unit/module 136, a mobile device control unit/module 138, and a checkout processing unit/module 140.

The communications interface unit/module 130 comprises program code that is executed by processing circuitry 112 to facilitate communicating data and information with one or more devices via network 12. Such devices include, but are not limited to, control computer 40 and other networked devices such as BLUETOOTH transceiver 18*a*, NFC transceiver 18*b*, and SCO stations 30. As described above, the data being communicated includes customer accessibility information obtained from the customer's mobile device, as well as the control messages generated based on that information and used to control the customer's mobile device to perform selected SCO functions in lieu of an SCO station 30.

The accessibility obtaining unit/module 132 comprises program code that is executed by processing circuitry 112 to obtain the customer accessibility information from the customer's mobile device, as previously described. The ADA determination unit/module 134 comprises program code that is executed by processing circuitry 112 to determine whether the customer has an ADA recognized disability based on the customer accessibility information, as previously described. The SCO function selection unit/module 136 comprises program code that is executed by processing circuitry 112 to select which particular functions, normally performed by SCO station 30, will instead be performed by the customer's mobile device. The mobile device control unit/module 138 comprises program code that is executed by processing circuitry 112 to generate the control messages sent to the customer's mobile device that configure that device to perform the selected SCO functions. The checkout processing unit/module 140 comprises program code that is executed by processing circuitry 112 to perform the checkout processing using the data sent by the SCO station 30 and/or the customer's mobile device.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method comprising:
   establishing a short-range communication link between a customer's mobile device and a computing device of a retail store responsive to detecting the customer's mobile device proximate an SCO station in the retail store;
   obtaining, by the computing device, accessibility information about the customer;
   determining, by the computing device, that the customer has a disability recognized by the Americans with Disabilities Act (ADA) based on the accessibility information;
   responsive to determining that the customer has the disability recognized by the ADA, selecting, by the computing device, an SCO function to be performed at the customer's mobile device in lieu of, and independently from, the SCO station;
   responsive to the selecting, prohibiting, by the computing device, the SCO station from performing the selected SCO function while the customer's mobile device performs the SCO function; and controlling, by the computing device, the customer's mobile device via the short-range communication link to perform the SCO function in lieu of, and independently from, the SCO station.

2. The method of claim 1 wherein the short-range communications link is a Bluetooth link or a Near Field Communication (NFC) link.

3. The method of claim 2 wherein when the short-range communications link is an NFC link, the method further comprises establishing, by the computing device, a Bluetooth communication link with the customer's mobile device.

4. The method of claim 1 wherein obtaining, by the computing device, accessibility information about the customer comprises obtaining accessibility settings of the customer from the customer's mobile device via the short-range communications link.

5. The method of claim 1 wherein obtaining, by the computing device, accessibility information about the customer comprises:
 receiving information identifying the customer from the customer's mobile device;
 obtaining customer loyalty information associated with the customer based on the information identifying the customer; and
 determining that the customer has the disability recognized by the ADA based on the customer loyalty information associated with the customer.

6. The method of claim 1 wherein the SCO function performed at the customer's mobile device further comprises one or more of:
 a scanning function that configures the customer's mobile device to function as an SCO scanner;
 a payment processing function that configures the customer's mobile device to function as an SCO payment processing device; and
 a signature function that configures the customer's mobile device to obtain the customer's signature for the scanned items.

7. The method of claim 1 wherein controlling, by the computing device, the customer's mobile device to perform the SCO function in lieu of, and independently from, the SCO station comprises:
 generating a control message comprising a command that configures the customer's mobile device to perform the SCO function in lieu of, and independently from, the SCO station; and
 sending the control message to the customer's mobile device via the short-range communication link.

8. The method of claim 7 further comprising:
 receiving, by the computing device and from the customer's mobile device, data produced by the SCO function performed at the customer's mobile device;
 processing, by the computing device, the data produced by the SCO function performed at the customer's mobile device as part of checking out the customer.

9. The method of claim 1 further comprising releasing, by the computing device, the short-range communication link established with the customer's mobile device responsive to determining that the SCO process is complete.

10. The method of claim 1 further comprising:
 for each of a plurality of customers waiting in line to check out at a first SCO station, inserting, by the computing device, information about the customer into a waiting queue for the first SCO station, wherein the information about the customer comprises:
  an identifier identifying a mobile device of the customer; and
  a disability indicator indicating whether the customer has the disability recognized by the ADA;
 monitoring, by the computing device, the waiting queue for the first SCO station to detect a predetermined event;
 transferring, by the computing device, the information for one or more selected customers from the waiting queue for the first SCO station to a waiting queue for the second SCO station responsive to detecting the predetermined event; and
 sending, by the computing device, a message to the mobile device of each of the one or more selected customers informing them to checkout at the second SCO station.

11. The method of claim 10 wherein the one or more selected customers do not have the disability recognized by the ADA.

12. The method of claim 10 wherein the one or more selected customers have the disability recognized by the ADA.

13. The method of claim 10 wherein the predetermined event comprises:
 expiration of the timer associated with the waiting queue for the first SCO station; and/or
 the waiting queue for the first SCO station exceeding a maximum queue size.

14. A computing device comprising:
 communications circuitry configured to communicate with a customer's mobile device via a short-range transceiver; and
 processing circuitry operatively connected to the communications circuitry and configured to:
  establish a short-range communication link with a customer's mobile device via the short-range transceiver responsive to detecting the customer's mobile device proximate an SCO station in the retail store;
  obtain accessibility information about the customer;
  determine that the customer has a disability recognized by the Americans with Disabilities Act (ADA) based on the accessibility information;
  responsive to determining that the customer has the disability recognized by the ADA, select an SCO function to be performed at the customer's mobile device in lieu of, and independently from, the SCO station;
  responsive to the selecting, prohibit the SCO station from performing the selected SCO function while the customer's mobile device performs the SCO function; and
  control the customer's mobile device via the short-range communication link to perform an SCO function in lieu of, and independently from, the SCO station.

15. The computing device of claim 14 wherein the processing circuitry is configured to obtain accessibility settings of the customer from the customer's mobile device.

16. The computing device of claim 14 wherein to obtain accessibility information about the customer, the processing circuitry is configured to:
 receive information identifying the customer from the customer's mobile device;

obtain customer loyalty information associated with the customer based on the information identifying the customer; and determine that the customer has the disability recognized by the ADA based on the customer loyalty information.

17. The computing device of claim 14 wherein the processing circuitry is further configured to select which SCO function is to be performed at the customer's mobile device in lieu of, and independently from, the SCO station, the selected SCO function further comprising:

a scanning function that configures the customer's mobile device to function as an SCO scanner;

a payment processing function that configures the customer's mobile device to function as an SCO payment processing device; and/or a signature function that configures the customer's mobile device to obtain the customer's signature for the scanned items.

18. The computing device of claim 14 wherein to control the customer's mobile device to perform an SCO function in lieu of, and independently from, the SCO station, the processing circuitry is configured to:

generate a control message comprising a command that configures the customer's mobile device to perform the SCO function in lieu of, and independently from, the SCO station; and send the control message to the customer's mobile device via the short-range communication link.

19. The computing device of claim 14 wherein the processing circuitry is further configured to:

for each of a plurality of customers waiting in line to check out at a first SCO station, insert a customer entry into a waiting queue for the first SCO station, wherein the customer entry comprises:

an identifier identifying a mobile device of the customer; and a disability indicator indicating whether the customer has the disability recognized by the ADA;

monitor the waiting queue for the first SCO station to detect a predetermined event;

move one or more selected customers from the waiting queue for the first SCO station to a waiting queue for the second SCO station responsive to detecting the predetermined event; and send a message to the mobile device of each of the one or more selected customers informing them to checkout at the second SCO station.

20. The computing device of claim 19 wherein the processing circuitry is configured to:

detect that a timer associated with the waiting queue for the first SCO station has expired; and/or detect that the waiting queue for the first SCO station exceeds a predetermined maximum queue size.

21. A non-transitory computer readable medium storing program code that, when executed by a processing circuit of a computing device associated with a retail store, causes the computing device to:

establish a short-range communication link with a customer's mobile device responsive to detecting the customer's mobile device proximate an SCO station in the retail store;

obtain accessibility information about the customer;

determine that the customer has a disability recognized by the Americans with Disabilities Act (ADA) based on the accessibility information;

responsive to determining that the customer has the disability recognized by the ADA, select an SCO function to be performed at the customer's mobile device in lieu of, and independently from, the SCO station;

responsive to the selecting, prohibit the SCO station from performing the selected SCO function; and control the customer's mobile device via the short-range communication link to perform an SCO function in lieu of, and independently from, the SCO station.

* * * * *